US011184232B2

(12) United States Patent
Rahmes et al.

(10) Patent No.: US 11,184,232 B2
(45) Date of Patent: *Nov. 23, 2021

(54) RADIO FREQUENCY (RF) COMMUNICATION SYSTEM PROVIDING ENHANCED RF EQUIPMENT CONFIGURATION UPDATES FOR MOBILE VEHICLES BASED UPON REWARD MATRICES AND RELATED METHODS

(71) Applicant: EAGLE TECHNOLOGY, LLC, Melbourne, FL (US)

(72) Inventors: Mark D. Rahmes, Melbourne, FL (US); David Bruce Chester, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/199,505

(22) Filed: Nov. 26, 2018

(65) Prior Publication Data

US 2020/0169458 A1    May 28, 2020

(51) Int. Cl.
| | |
|---|---|
| *H04L 12/24* | (2006.01) |
| *H04B 7/185* | (2006.01) |
| *G01S 7/00* | (2006.01) |
| *H04W 4/40* | (2018.01) |
| *G01S 13/933* | (2020.01) |

(52) U.S. Cl.
CPC ............ *H04L 41/082* (2013.01); *G01S 7/006* (2013.01); *G01S 13/933* (2020.01); *H04B 7/18504* (2013.01); *H04B 7/18506* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 8,201,773 | B1 * | 6/2012 | Durham | ................ B64C 39/028 |
| | | | | 244/218 |
| 8,239,231 | B2 | 8/2012 | Lian | |
| 9,053,426 | B2 | 6/2015 | Chester et al. | |
| 9,122,993 | B2 | 9/2015 | Chester et al. | |
| 9,147,164 | B2 | 9/2015 | Chester et al. | |
| 9,171,268 | B1 * | 10/2015 | Penilla | ................ B60L 53/305 |

(Continued)

OTHER PUBLICATIONS

Burdakov et al. "Positioning Unmanned Aerial Vehicles as Communication relays for Surveillance Tasks," Linkoping University, Jun. 2009.*

(Continued)

*Primary Examiner* — Andrew C Oh
(74) *Attorney, Agent, or Firm* — Allen, Dyer, Doppelt + Gilchrist, P.A.

(57) ABSTRACT

A radio frequency (RF) communication system may include mobile vehicles, with each mobile vehicle including RF equipment and a controller. The controller may be configured to determine a reward matrix based upon possible RF equipment configurations and associated operational parameters, and operate the RF equipment to implement an RF equipment configuration based upon the reward matrix. The system may also include an oversight controller configured to update respective reward matrices of the mobile vehicles.

22 Claims, 12 Drawing Sheets

(56) References Cited

U.S. PATENT DOCUMENTS

| | | | |
|---|---|---|---|
| 9,229,905 B1* | 1/2016 | Penilla | H04L 67/306 |
| 9,232,527 B2 | 1/2016 | Sonnenberg et al. | |
| 9,407,566 B2 | 8/2016 | Koponen et al. | |
| 9,408,200 B2 | 8/2016 | Kim et al. | |
| 9,413,496 B2 | 8/2016 | Lim et al. | |
| 9,622,133 B1* | 4/2017 | Guvenc | H04W 4/90 |
| 10,211,906 B1* | 2/2019 | Nam | H04B 7/0452 |
| 10,396,919 B1* | 8/2019 | O'Shea | G06N 3/0454 |
| 2006/0167784 A1* | 7/2006 | Hoffberg | G06Q 50/188 |
| | | | 705/37 |
| 2009/0299496 A1 | 12/2009 | Cade | |
| 2009/0323638 A1* | 12/2009 | Catovic | H04W 36/00837 |
| | | | 370/331 |
| 2010/0080136 A1* | 4/2010 | Hunzinger | H04L 41/147 |
| | | | 370/252 |
| 2010/0124918 A1* | 5/2010 | Agashe | H04W 36/0079 |
| | | | 455/423 |
| 2010/0238986 A1* | 9/2010 | Gholmieh | H04L 5/0094 |
| | | | 375/220 |
| 2010/0273487 A1* | 10/2010 | Alonso-Rubio | H04W 36/385 |
| | | | 455/436 |
| 2010/0317420 A1* | 12/2010 | Hoffberg | G06Q 30/0282 |
| | | | 463/1 |
| 2013/0078993 A1* | 3/2013 | Okino | H04W 36/00837 |
| | | | 455/424 |
| 2013/0084871 A1* | 4/2013 | Kitaji | H04W 36/0085 |
| | | | 455/436 |
| 2013/0084874 A1* | 4/2013 | Fujishiro | H04W 36/00837 |
| | | | 455/440 |
| 2013/0316709 A1* | 11/2013 | Watanabe | H04W 60/00 |
| | | | 455/435.2 |
| 2014/0038608 A1* | 2/2014 | Won | H04W 36/32 |
| | | | 455/436 |
| 2014/0038612 A1* | 2/2014 | Wang | H04W 36/00837 |
| | | | 455/436 |
| 2014/0214243 A1 | 7/2014 | Whitehead et al. | |
| 2014/0321430 A1* | 10/2014 | Bakker | H04W 36/0072 |
| | | | 370/331 |
| 2014/0362717 A1* | 12/2014 | Koskinen | H04W 24/02 |
| | | | 370/252 |
| 2015/0092746 A1* | 4/2015 | Jang | H04W 24/08 |
| | | | 370/331 |
| 2015/0208308 A1* | 7/2015 | Watanabe | H04W 36/0088 |
| | | | 455/436 |
| 2015/0215094 A1* | 7/2015 | Meng | H04L 1/1861 |
| | | | 370/280 |
| 2015/0256320 A1* | 9/2015 | Feng | H04W 74/004 |
| | | | 370/280 |
| 2015/0271717 A1* | 9/2015 | Moon | H04W 76/18 |
| | | | 455/437 |
| 2015/0281975 A1* | 10/2015 | Scheim | H04W 16/18 |
| | | | 455/446 |
| 2015/0289169 A1* | 10/2015 | Capdevielle | H04W 36/0007 |
| | | | 455/436 |
| 2015/0296501 A1* | 10/2015 | Haran | H04B 7/06 |
| | | | 370/329 |
| 2016/0238404 A1 | 8/2016 | Okada et al. | |
| 2016/0302117 A1* | 10/2016 | Inoue | H04W 36/305 |
| 2016/0345231 A1* | 11/2016 | Moon | H04W 36/04 |
| 2017/0070896 A1* | 3/2017 | Shindo | H04W 36/14 |
| 2017/0188273 A1* | 6/2017 | Yiu | H04W 8/26 |
| 2017/0195037 A1* | 7/2017 | Lohman | H04B 7/18504 |
| 2017/0195048 A1* | 7/2017 | Sham | H04B 10/1129 |
| 2017/0235316 A1 | 8/2017 | Shattil | |
| 2017/0273069 A1* | 9/2017 | Tenny | H04W 36/0072 |
| 2017/0302776 A1* | 10/2017 | Lu | H04B 7/04 |
| 2017/0303123 A1* | 10/2017 | Villar | H04L 67/18 |
| 2018/0012137 A1 | 1/2018 | Wright et al. | |
| 2018/0022361 A1* | 1/2018 | Rao | B60W 30/143 |
| | | | 701/23 |
| 2018/0046961 A1 | 2/2018 | Tulabandhula et al. | |
| 2018/0060459 A1* | 3/2018 | English | B25J 9/1671 |
| 2018/0098330 A1* | 4/2018 | Nguyen | H04W 16/06 |
| 2018/0124631 A1 | 5/2018 | Ramos De Azevedo | |
| 2018/0152870 A1* | 5/2018 | Park | G05D 1/0022 |
| 2018/0199381 A1* | 7/2018 | Rong | H04W 74/08 |
| 2018/0234970 A1* | 8/2018 | Hall | H04W 72/0453 |
| 2018/0248613 A1* | 8/2018 | Peitzer | H04W 48/10 |
| 2018/0262367 A1 | 9/2018 | Alieiev et al. | |
| 2018/0293514 A1 | 10/2018 | Koseki et al. | |
| 2018/0294871 A1* | 10/2018 | Kosseifi | B64C 39/024 |
| 2018/0294920 A1* | 10/2018 | Chen | H04L 1/0043 |
| 2018/0375552 A1* | 12/2018 | Athley | H04B 7/0695 |
| 2019/0049962 A1* | 2/2019 | Ouellette | B64C 39/024 |
| 2019/0058523 A1* | 2/2019 | Wu | H04B 7/0617 |
| 2019/0072959 A1 | 3/2019 | Palanisamy et al. | |
| 2019/0081767 A1* | 3/2019 | Luo | H04B 7/026 |
| 2019/0089427 A1* | 3/2019 | Chang | H04B 7/0617 |
| 2019/0112049 A1* | 4/2019 | Phan | B64D 5/00 |
| 2019/0116586 A1* | 4/2019 | Mallick | H04W 72/02 |
| 2019/0122235 A1* | 4/2019 | Baras | G06F 9/542 |
| 2019/0126999 A1* | 5/2019 | Priev | B62D 63/04 |
| 2019/0154872 A1 | 5/2019 | Leduc | |
| 2019/0166568 A1* | 5/2019 | Tang | H04W 72/0466 |
| 2019/0182644 A1* | 6/2019 | Zheng | H04W 72/1205 |
| 2019/0220737 A1* | 7/2019 | Yao | G06N 3/006 |
| 2019/0268886 A1* | 8/2019 | Tang | H04W 72/044 |
| 2019/0300185 A1* | 10/2019 | Tang | G08G 5/00 |
| 2019/0371348 A1 | 12/2019 | Shahbazi | |
| 2019/0393948 A1* | 12/2019 | Zhao | H04B 7/0452 |
| 2020/0034747 A1* | 1/2020 | Elturki | G06N 3/08 |
| 2020/0052770 A1* | 2/2020 | Chen | H04B 7/0626 |
| 2020/0096594 A1* | 3/2020 | Virtej | G05D 1/106 |
| 2020/0136774 A1* | 4/2020 | Tang | H04W 72/04 |
| 2020/0137775 A1* | 4/2020 | Tang | H04L 5/0082 |
| 2020/0169317 A1* | 5/2020 | Rahmes | G08G 5/0008 |
| 2020/0169924 A1* | 5/2020 | Lobinger | H04W 36/0009 |

OTHER PUBLICATIONS

Rahmes et al., U.S. Appl. No. 16/199,580, filed Nov. 26, 2018.

Blazovics et al., "On the benefits of cognitive infocommunication for mobile communication nodes using cooperative concepts", IEEE, Dec. 2013, pp. 693-698.

Bletsas et al., "Cooperative diversity with opportunistic relaying", IEEE, 2006, pp. 1034-1039.

Burdakov et al., "Positioning unmanned aerial vehicles as communication relays for surveillance tasks", Robotices: Science and Systems, 2009, pp. 1-9.

Cao et al., "On optimal communication strategies for cooperative cognitive radio networking", IEEE, 2013, pp. 1726-1734.

Cichon et al., "Mobitlity-aware, correlation-based node grouping and selection for cooperative spectrum sensing", Journal of Telecommunications and Information Technology, Feb. 2014, pp. 90-102.

Cohen et al., "Q-learning multi-objective sequential optimal sensor parameter weights", 2016, pp. 1-6.

Craig, "ONR Electronic warfare S&T industry day", Office of Naval Research, Jan. 2014, pp. 1-57.

Demers et al., "Analysis and simulation of a fair queueing algorithm" SIGCOMM Proceedings, Sep. 1989, pp. 1-14.

Geckle et al., "Modeling and simulation of sensor task assignment and scheduling", American Society of Naval Engineers, 2008, pp. 1-8.

Hamdi et al., "Impact of noise power uncertainty on cooperative spectrum sensing in cognitive radio systems", IEEE, 2010, pp. 1-5.

Hanawal et al., "Game theoretic anti-jamming dynamic frequency hopping and rate adaptation in wireless systems", Department of Electrical and Computer Engineering, University of Arizona, Aug. 2013, pp. 1-20.

Han et al., "Joint frequency-hopping waveform design for MIMO radar estimation using game theory", IEEE Radar Conference, 2013, pp. 1-4.

Hasselt, "Reinforcement learning in continuous state and action spaces", Reinforcement Learning, 2012, pp. 207-208.

Hossain, "IEEE Distinguished Lecture: On coalition-based cooperative packet delivery in vehicular delay-tolerant networks under uncertainty", IEEE, Sep. 2016, pp. 1-6.

(56) References Cited

OTHER PUBLICATIONS

Ibnkahla, "Cooperative cognitive radio networks: the complete spectrum cycle", 2014, p. 1.
Keller, "Programmable radar and adaptive electronic warfare take center stage", Military Aerospace, Apr. 2013, pp. 1-8.
Kocaman, "Distributed beamforming in a swarm UAV network", Naval Postgraduate School, Mar. 2008, 1-91.
Kwak, "Application of DRFM in ECM for pulse type radar", IEEE International Conference on Infrared, 2009, pp. 1-2.
Lambrechts et al., "SiGE-based re-engineering of electronic warfare subsystems", 2016, p. 1.
Letaief et al, "Cooperative communications for cognitive radio networks", IEEE Proceedings, vol. 97, No. 5, May 2009, pp. 878-893.
Li et al., "On efficient resource allocation for cognitive and cooperative communications", IEEE Journal of Latex Class Files, vol. 11, No. 4, Dec. 2012, pp. 1-10.
Li et al., "Frequency agility MIMO-SAR imaging and anti-deception jamming performance", IRSI General Assembly and Scientific Symposium IEEE, 2014, pp. 1-4.
Marinho et al., "Using cooperative MIMO Techniques and UAV relay networks to support connectivity in sparse wireless sensor networks", IEEE Computing, Management and Telecommunications, 2013, pp. 49-54.
Mears, "Cooperative electronic attack using unmanned air vehicles", 2007, pp. 42-48.
Nguyen et al., Cooperative MIMO in wireless networks: recent developments and challenges, Department of Electrical and Computer Engineering, University of Arizona, no date available, pp. 1-7.
Panichpattanakul, Thesis: Cooperative communication in ad hoc networks, Universite de Toulouse, Nov. 2010, pp. 1-185.
Parisi et al., "Policy gradient approaches for multi-objective sequential decision making: a comparison", 2014, pp. 1-8.
Pei et al., "Cognitive networking for next-g wireless communications", International Journal of Distributed Sensor Networks, vol. 2016, Nov. 2015, pp. 1-2.
Pomerleau, "AFRL seeks cognitive electronic warfare research", DISA Forecast to Industry Day, Jul. 2016, pp. 1-4.
Rahmes et al., "Cognitive mission planning and system orchestration", Harris Corporation, no date available, pp. 1-5.
Rahmes et al., "Optimal multi-dimensional fusion model for sensor allocation and accuracy assessment", IEEE Syscon, 2016, pp. 1-7.
Roy, "Epistemic logic and the foundations of decision and game theory", Journal of the Indian Council of Philosophical Research, Sep. 2010, pp. 1-25.
Singh, "Cooperative communications for cognitive radio networks", SRI Ramswaroop Memorial College of Engineering and Management, 2015, pp. 1-28.
Song et al., "Jammer detection and estimation with MIMO radar", IEEE, Conference Record of the Forty Sixth Asilomar Conference on Signals, Systems and Computers, 2012, pp. 1312-1316.
Teo, "Closing the gap between research and field applications for multi-UAV cooperative missions", Institutional Archive of the Naval Postgraduate School, Sep. 2013, pp. 1-126.
Wines Lab, "Cognitive and cooperative networks", Nov. 2018, pp. 1-2.
Winston, "Operations Research Applications and Algorithms 4th Edition", 2003, pp. 1-17.
"XI Conference on reconnaissance and electronic warfare systems", Conference on Reconnaissance and Electronic Ware Systems, Nov. 2016, pp. 1-17.
Zeng et al., "Wireless communications with unmanned aerial vehicles: opportunities and challenges", IEEE Communications Magazine, Feb. 2016, pp. 1-15.
Zhang et al., "Optimization of cooperative spectrum sensing with energy detection in cognitive radio networks", IEEE Transactions on Wireless Communications, vol. 8, No. 12, Dec. 2009, pp. 5761-5766.
Zubair et al., "Mobility-enhances reliable geographical forwarding in cognitive radio sensor networks", UTM-MIMOS Centre of Excellence in Telecommunication Technology, Faculty of Electrical Engineering, Universiti Teknologi Malaysia, Jan. 2016, pp. 1-30.
Rhames et al. "Cooperative Cognitive Electronic Warfare UAV Game Modeling for Frequency Hopping Radar" SPIE Apr. 2018; pp. 8.
Rahmes et al. "Optimizing Cooperative Games for Cognitive Communication UAVs with Q-Learning" Interservice/Industry Training, Simulation, and Education Conference (I/ITSEC) 2017; pp. 10.
Li et al. "On Efficient Resource Allocation for Cognitive and Cooperative Communications" citeseerx.ist.psu.edu/viewdoc/download;jsessionid...?doi=10.1.1.415...pdf Journal of Latex Class Files, vol. 11, No. 4, Dec. 2012; pp. 10.
Caso et al. "Impact of Spatio-Temporal Correlation in Cooperative Spectrum Sensing for Mobile Cognitive Radio Networks" ISWCS 2013; The Tenth International Symposium on Wireless Communication Systems: Oct. 15, 2013 acts.ing.uniroma1.it/Papers/3_Caso_DeNardis_Holtand...CRAFT.pdf; pp. 5.
Xue et al. "Cooperative Spectrum Sensing in Cognitive Radio Networks Using Multidimensional Correlations" www2.ece.ohio-state.edu/~ekici/papers/coop_sense_two.pdf; IEEE Transactions on Wireless Communications, vol. 13, No. 4, Apr. 2014; pp. 12.
Symposium Agenda | 50th Annual Convention | Conventions, https://www.crows.org/conventions/symposium-agenda-2013.html, Oct. 2013, pp. 1-7.

* cited by examiner

SCENARIO 1:
IDEAL:
d01: 200m; loss; .46 dBW
d12: 200m; loss; .46 dBW
d23: 200m; loss; .46 dBW
d34: 200m; loss; .46 dBW
d45: 200m; loss; .46 dBW
d56: 200m; loss; .46 dBW

WITH COOPERATION:
d01: 250m; loss; 2.40 dBW
d12: 210m; loss; .88 dBW
d23: 160m; loss; -1.48 + 10 = 8.52 dBW
d34: 160m; loss; -1.48 + 10 = 8.52 dBW
d45: 210m; loss; .88 dBW
d56: 210m; loss; .88 dBW

WITHOUT COOPERATION:
d01: 200m; loss; .46 dBW
d12: 200m; loss; .46 dBW
d23: 200m; loss; .46 + 10 = 10.46 dBW
d34: 200m; loss; .46 + 10 = 10.46 dBW
d45: 200m; loss; .46 dBW
d56: 200m; loss; .46 dBW

SIGNAL ATTENUATION:
$$S = P/(4\pi(d)^2)$$

P: 20 WATTS
d: METERS

DESIGN: MAX LOSS PER LINK IS: 10 dbW

SCENARIO 2:
IDEAL:
d01: 200m; loss; .46 dBW
d12: 200m; loss; .46 dBW
d23: 200m; loss; .46 dBW
d34: 200m; loss; .46 dBW
d45: 200m; loss; .46 dBW
d56: 200m; loss; .46 dBW

WITH COOPERATION:
d01: 180m; loss; -.45 + 10 = 9.55 dBW
d12: 100m; loss; -.45 + 10 = 9.55 dBW
d23: 240m; loss; 2.04 dBW
d34: 240m; loss; 2.04 dBW
d45: 160m; loss; -1.48 + 10 = 8.52 dBw
d56: 180m; loss; -.45 +10 = 9.55 dBw

WITHOUT COOPERATION:
d01: 200m; loss; .46 + 10 = 10.46 dBW
d12: 200m; loss; .46 + 10 = 10.46 dBW
d23: 200m; loss; .46dBW
d34: 200m; loss; .46dBW
d45: 200m; loss; .46 + 10 = 10.46 dBW
d56: 200m; loss; .46 + 10 = 10.46 dBW

FIG. 11

RADIO FREQUENCY (RF) COMMUNICATION SYSTEM PROVIDING ENHANCED RF EQUIPMENT CONFIGURATION UPDATES FOR MOBILE VEHICLES BASED UPON REWARD MATRICES AND RELATED METHODS

TECHNICAL FIELD

The present invention relates to the field of radio frequency (RF) communication, and more particularly, RF communication between mobile nodes in an RF network.

BACKGROUND

Mobile vehicles with RF capabilities may be deployed in numerous environments for various purposes. For example, in many applications it is desirable to transmit information from a remote location to a base station in real time. However, limited communication ranges and free line of sight may make direct transmissions from distant targets impossible, particularly when operating over rough terrain and long distances. One approach to overcome these obstacles is by using relay chains including one or more intermediate relay (e.g., unmanned aerial vehicles or UAVs) defining an RF relay network.

A relay network is a broad class of network topology commonly used in wireless networks and is characterized by a source and destination connected by intermediate nodes. This addresses the fact that, in a widely distributed network, the source and destination cannot communicate directly because the link would be degraded due to, for example, distance-dependent free space path loss (FSPL) or signal interference. The intermediate nodes in a relay network allow for shorter signal propagation distances that effectively mitigate the impact of FSPL and RF interference. In information theory, a relay channel is a probability model of the communication parameters between a sender and a receiver aided by one or more intermediate relay nodes.

One approach to coordinating the activities of RF devices in an RF network, such as an RF relay network or other RF node configurations, is through cognitive control techniques. An example cognitive network and associated methods are disclosed in U.S. Pat. No. 9,147,164 to Chester et al., which is assigned to the present Applicant and is hereby incorporated herein in its entirety by reference. The method includes generating Initialization Parameters ("IPs") for a first Multi-Objective Optimization ("MOO") algorithm based on project requirements, determining a first Pareto Front ("PF") for a first Protocol Stack Layer ("PSL") of a protocol stack by solving the first MOO algorithm using IPS, and initializing or constraining a second MOO algorithm using the first PF. The method also includes determining a second PF for a second PSL succeeding the first PSL using the second MOO algorithm, analyzing the first and second PFs to develop Best Overall Network Solutions ("BONSs"), ranking the BONSs according to a pre-defined criteria, and identifying a top ranked solution for BONSs that complies with current regulatory and project policies. The method further includes computing configuration parameters for protocols of PSLs that enable implementation of the top ranked solution within the cognitive network, and dynamically re-configuring network resources of PSLs using the configuration parameters.

Despite the existence of such advantageous configurations, further capabilities for controlling mobile vehicle positioning and/or RF operations may be desirable in certain applications.

SUMMARY

A radio frequency (RF) communication system may include a plurality of mobile vehicles, with each mobile vehicle including RF equipment and a controller. The controller may be configured to determine a reward matrix based upon possible RF equipment configurations and associated operational parameters, and operate the RF equipment to implement an RF equipment configuration based upon the reward matrix. The system may also include an oversight controller configured to update respective reward matrices of the plurality of mobile vehicles.

More particularly, the possible RF equipment configurations may include transmit and receive operating configurations. In accordance with another example, the possible RF equipment configurations may include radar operating configurations. In still another example implementation, the possible RF equipment configurations may include operating frequency band configurations.

Furthermore, the oversight controller may be configured to update the reward matrices by changing weights associated with at least some of the operational parameters. By way of example, the oversight controller may be configured to change the weights based upon based upon Q-learning. Also by way of example, each controller may be configured to implement an RF equipment configuration based upon the reward matrix and a linear optimization. The mobile vehicles may comprise unmanned aerial vehicles (UAV) in some embodiments.

A related radio frequency (RF) communications method for a plurality of mobile vehicles, such as those described briefly above, is also provided. The method may include, at each mobile vehicle, determining a reward matrix based upon possible RF equipment configurations and associated operational parameters and operating the RF equipment to implement an RF equipment configuration based upon the reward matrix. The method may further include, at an oversight controller, updating respective reward matrices of the plurality of mobile vehicles.

BRIEF DESCRIPTION OF THE DRAWINGS

FIG. 11 is a table illustrating simulation results from the examples of FIGS. 5 and 6.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
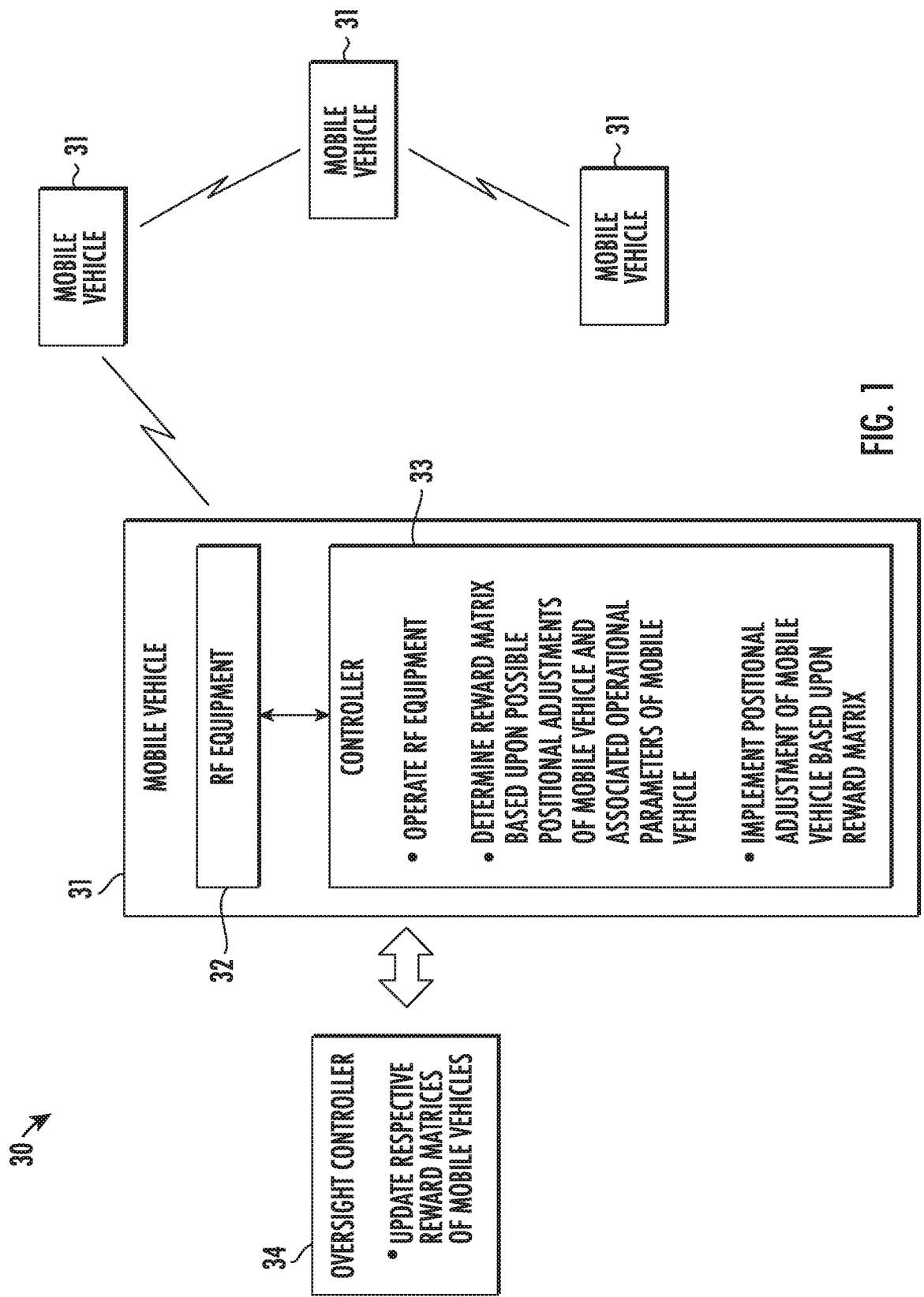
FIG. 1 is a schematic block diagram of a radio frequency (RF) communication system in accordance with an example embodiment.
Figure 2:
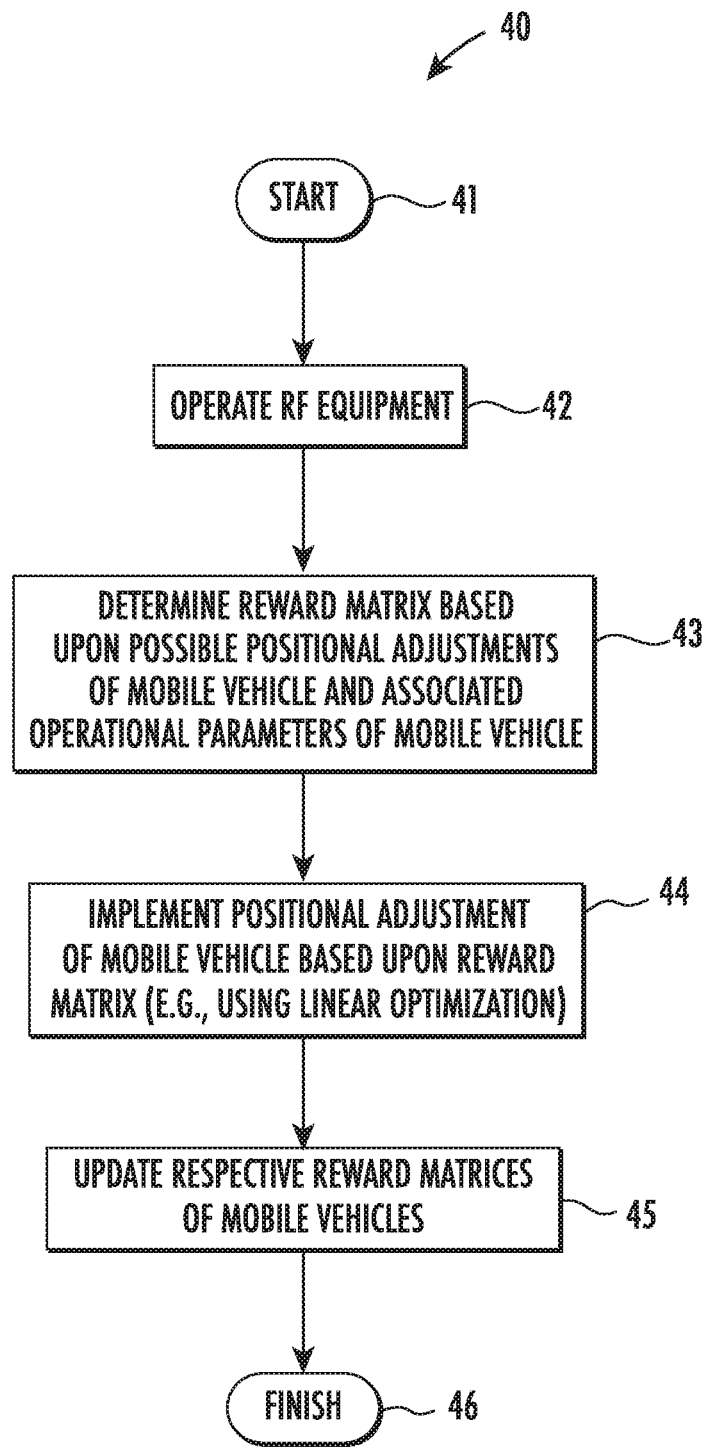
FIG. 2 is a flow diagram illustrating method aspects associated with the system of FIG. 1.

Referring initially to FIG. 1 and the flow diagram 40 of FIG. 2, a radio frequency (RF) communication system 30 and associated method aspects are first described. The system 30 illustratively includes a plurality of mobile vehicles 31, which may be land-based, ocean-based, or aerial-based vehicles in different embodiments, as well as combinations thereof. Each of the mobile vehicles 31 includes RF equipment 32 (e.g., a transmitter, a receiver, or a transceiver) and a controller 33 (although these components are only shown in one of the mobile vehicles in FIG. 1 for clarity of illustration). Beginning at Block 41, the controller 33 may be configured to operate the RF equipment 32, at Block 42, such as in a relay network, for example, although other RF network configurations and operations may also be used in different embodiments.

Furthermore, each controller 33 is configured to determine a respective reward matrix for its mobile vehicle 31 based upon possible positional adjustments of the mobile vehicle and associated operational parameters of the mobile vehicle, at Block 43, as will be discussed further below. The controller 33 also implements a positional adjustment of its respective mobile vehicle 31 based upon the reward matrix, at Block 44. Furthermore, the system 30 also illustratively includes an oversight controller 34 configured to update respective reward matrices of the plurality of mobile vehicles, at Block 45, which illustratively concludes the method illustrated in FIG. 2 (Block 46).

Figure 3:
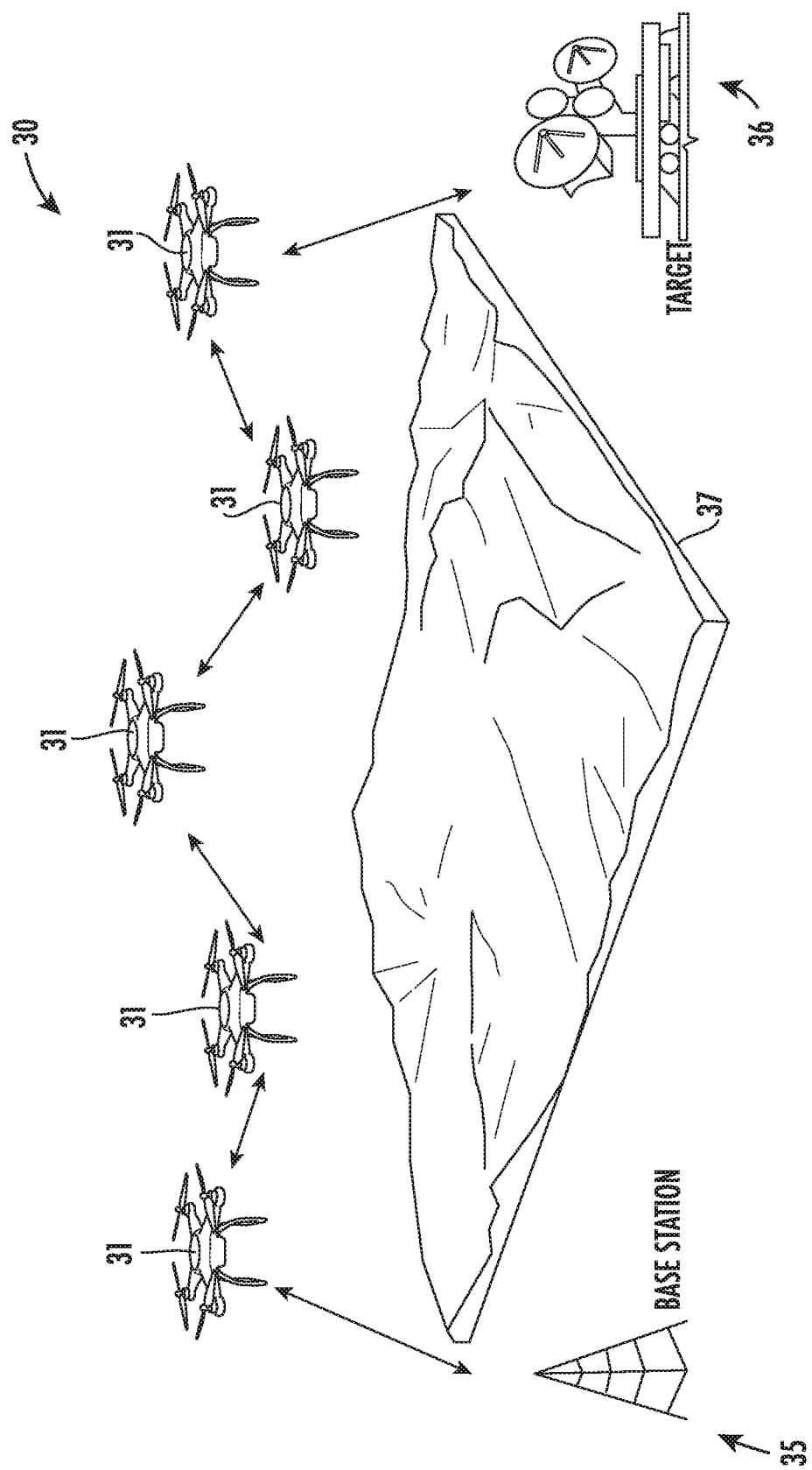
FIG. 3 is a schematic view of an example implementation of the system of FIG. 1 using unmanned aerial vehicles (UAVs) as mobile vehicles.
Figure 4:
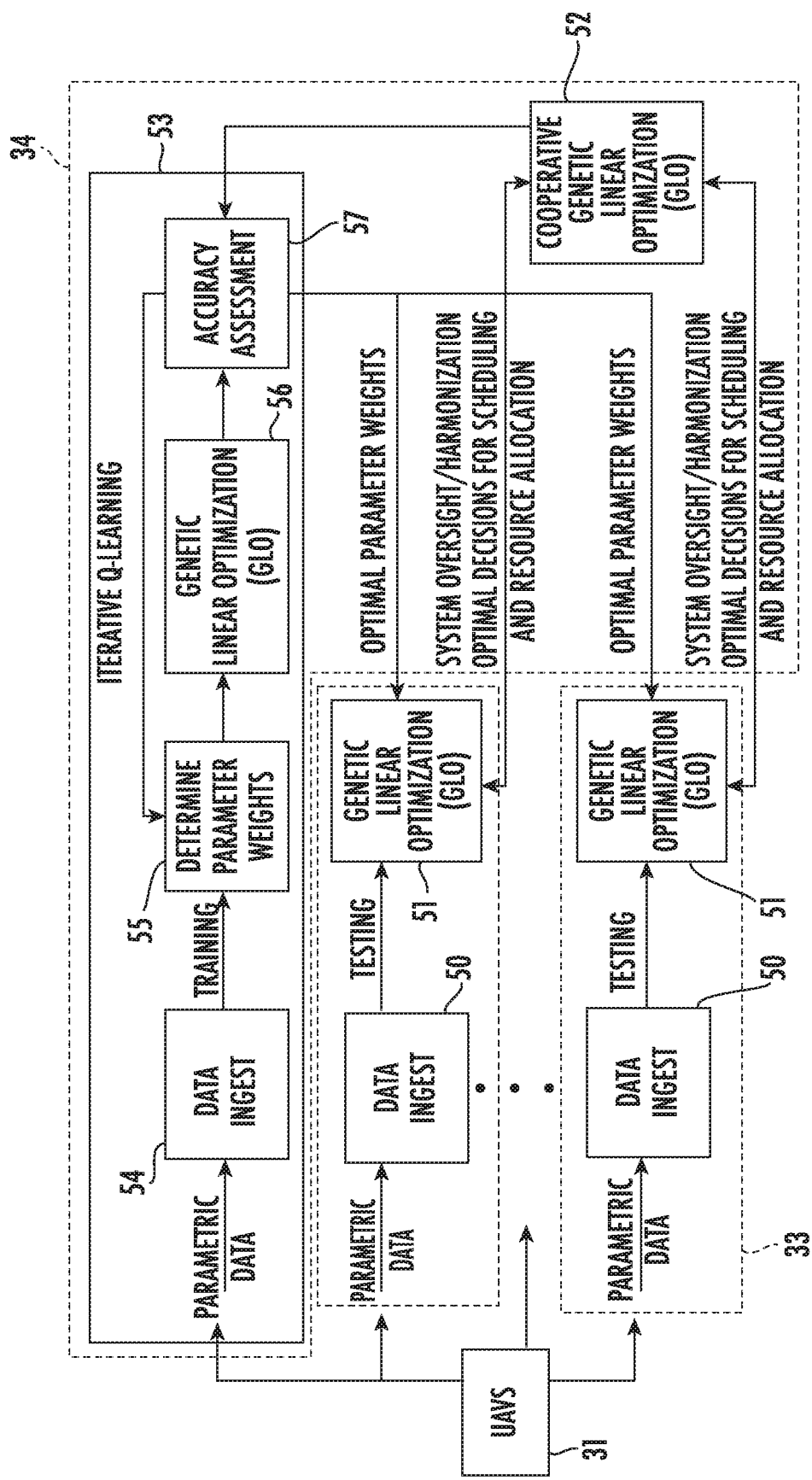
FIG. 4 is a schematic block diagram of an example implementation of the controllers of the system of FIG. 1.

Referring additionally to FIGS. 3-4, the foregoing will be further understood with reference to an example implementation of the system 30 in which the mobile vehicles 31 are UAVs implementing an RF relay network between a base station 35 and a target 36. A digital terrain model (DTM) 37 may also be used as input if desired, as shown in FIG. 3, to help ensure unobstructed line-of-sight signal paths.

By way of background, current distributed communications networks based on multiple UAVs have problems in terms of reliability and network availability. The capacity for each UAV to serve as a node in the network is constrained by energy stores, dynamic changes in the network topology, and latency/jitter issues, for example. Typical approaches to address these challenges have focused on partitioning of the network to work around failed nodes, but this has attendant degraded communications links and lengthy network outages.

Generally speaking, the present approach provides a self-forming, self-organizing, cooperative, autonomous system of distributed communication nodes (here UAVs 31). By enabling each UAV 31 to act collectively and cooperatively, a multi-UAV network's communication relay links may be made more resilient, resulting in enhanced levels of network availability and improved service quality. To achieve this, opportunistic arrays are used to aid in the development of a cooperative, cognitive system encompassing multiple vehicles. Furthermore, optimized vehicle positions are to be directed using decision algorithms that embody elements of game theory. In addition, by implementing a cooperative reasoning engine for system-level oversight or harmonization, enhanced performance of the overall system may be provided along with enhanced levels of service quality based on multiple measures of effectiveness.

Improvements in overall system performance and an enhanced capability to meet system requirements are just some of the benefits that may be realized through the cooperative self-positioning of UAVs. An inherent feature of the cognitive processing used for autonomous cooperative UAV positioning is detailed insight into the hierarchical elements of the system, i.e., the physical layer, application layer, packet layer, etc. That insight may be exploited at the system level to realize additional improvements in overall performance.

Game theory is the study of strategic decision-making and mathematical modeling of conflict and cooperation between intelligent, rational decision-makers, and is often thought of as an interactive decision theory. Modern game theory began with the idea of the existence of mixed-strategy equilibrium in two-person zero-sum games, applied to economics. Later, this evolved to provide a theory of expected utility, which allowed mathematicians and economists to treat decision making with uncertainty. The notion of probabilistic predictions utilizing game theory is important to many decision making applications because optimizing user experience requires being able to compute expected utilities of mutually exclusive data. The system 30 uses game theory as an optimal decision algorithm to choose the best direction for UAVs to travel to their assigned positions within a communication relay network.

The multi-UAV system 30 is both dynamic and flexible, enabling it to respond to emerging conditions that could impact network performance. Its ability to dynamically adjust the individual parameter weightings to account for changing conditions helps to ensure that UAV positioning decisions take into account both the immediate needs of a given network node, and the overall needs of the network. These conflicting needs form the basis for a game scenario in which each UAV 31 is alternately "pushed" or "pulled" over time to new positions until reaching a steady state, or Nash Equilibrium.

In the present example, individual parameter weights are initially optimized by the oversight controller 34 through training. Once the parameter weights are determined, they may be distributed to the UAV controllers 33 to support control decisions that optimize UAV 31 positioning. The oversight controller 34 may be implemented in various locations. For example, it may be located at the base station 35, the target station 36, in one of the UAVs 31, or remotely (e.g., in a cloud server). Moreover, the various operations performed by the oversight controller 34 may be distributed among more than one of these locations in some embodiments.

In the example illustrated in FIG. 4, each of the UAV controllers 33 illustratively includes a data ingest module 50 and a genetic linear optimization (GLO) module 51. Furthermore, the oversight controller 34 illustratively includes a cooperative GLO module 52 and an iterative Q-learning module 53, which in turn illustratively includes a data ingest module 54, parameter weight determination module 55, GLO module 56, and accuracy assessment module 57. Both the oversight controller 34 and UAV controller 33 may be implemented using appropriate hardware (e.g., microprocessors, etc.) and software implemented in a non-transitory computer-readable medium with associated instructions for performing the noted operations herein.

Figure 5:
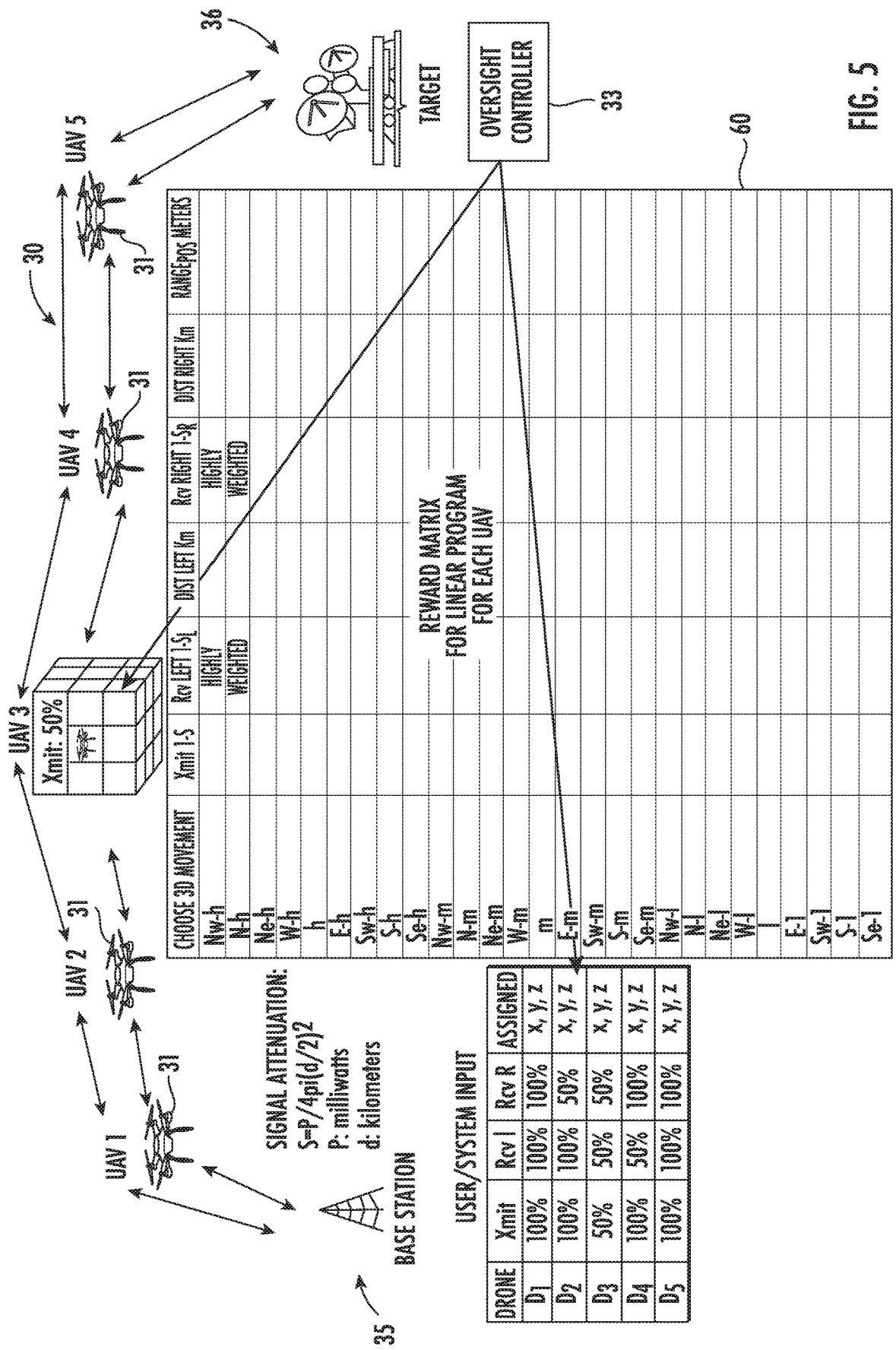
FIG. 5 is a schematic block diagram illustrating an example implementation of the system of FIG. 1 along with reward matrix update operations performed responsive to a first transmission anomaly.
Figure 6:
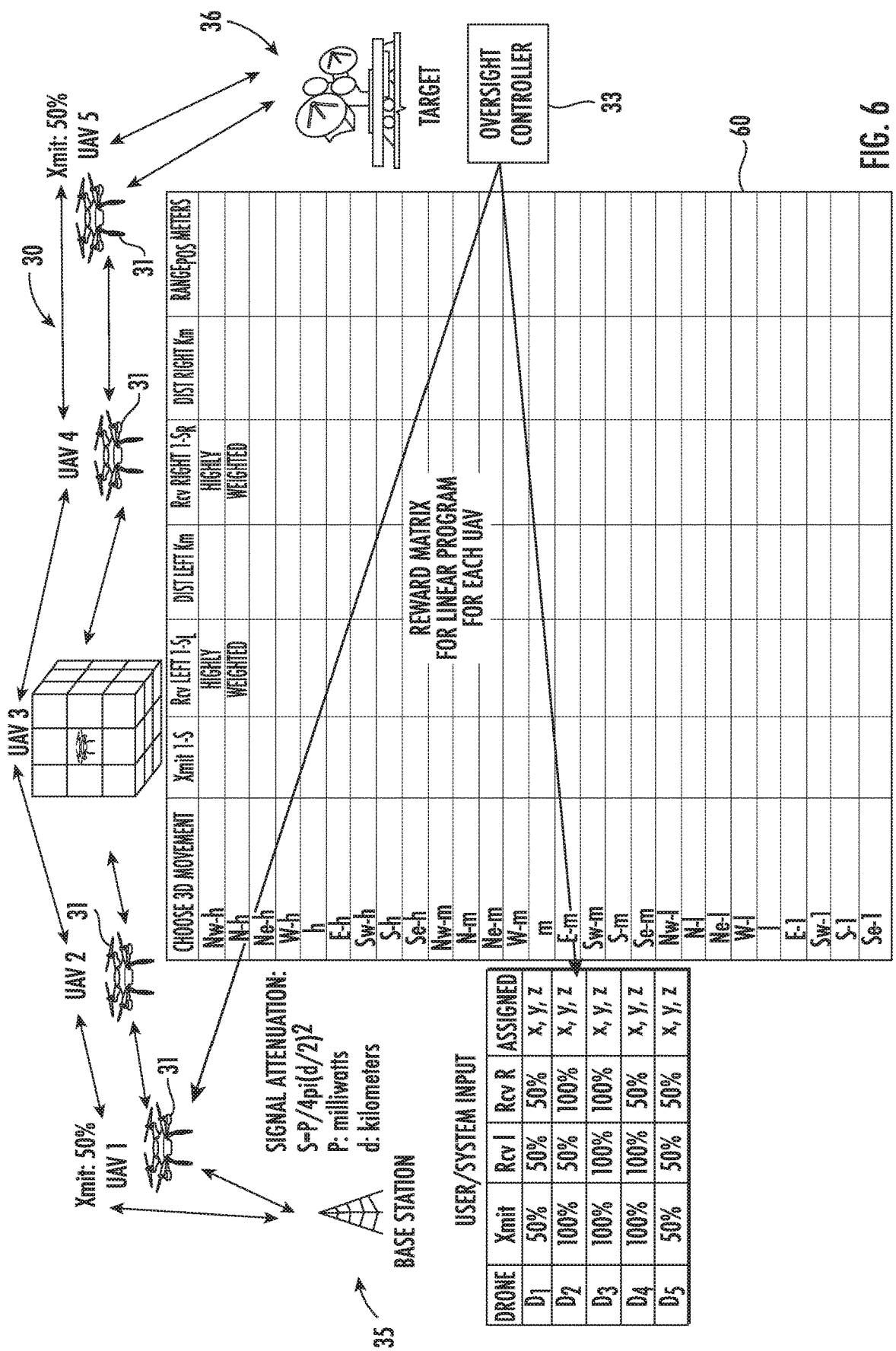
FIG. 6 is a schematic block diagram illustrating the example implementation of the system of FIG. 5 along with reward matrix update operations performed responsive to a second transmission anomaly.

Referring additionally to FIGS. 5 and 6, the present game theory implementation uses linear programming to define a UAV positioning decision matrix 60, also referred to as a reward matrix herein. Each row of the matrix 60 corresponds to one of twenty-seven directions in which to move, e.g., north, east, south, west, up, down, as shown in FIGS. 3 and 4. Each column is associated with a parameter, e.g., transmit power, reception quality for nearby UAVs, distance to nearby UAVs and range to initial optimal assigned position. The last parameter serves to keep the UAV 31 relatively near its assigned position.

Genetic algorithms (GAs) are currently used for optimally determining the best characteristic values for a given situation. GAs can play an important part in creating test scenarios to determine optimal values for multiple degrees of freedom. Analysts may also use game theory to develop models that better predict actual behavior. In the present example, a GA is combined with linear programming to create an enhanced game theory-based decision algorithm, which is referred to herein as Genetic Linear Optimization (GLO). The genetics portion of the algorithm are handled with an iterative process.

The examples shown in FIGS. 5 and 6 correspond to two simulations that were conducted to demonstrate the benefits from the enhanced cooperation. The weighting of parameters is an important driver for positioning decisions that move each UAV 31 such that positive overall system performance is achieved. For the results described herein, five UAVs were used as communication relays. The system 30 keeps a status of the health of each UAV 31 and adjusts the parameter weights, as needed, to help ensure that ongoing UAV positioning instructions continue to maintain optimal system communication links.

In a classic game theory scenario, a conductor chooses among a set of actions, the consequences of which depend on either certain states about which the conductor is not completely informed (i.e., subjective uncertainty) or the result of random, independent processes (i.e., objective uncertainty). The "expected utility" forms the basis for a prediction of what the conductor will choose in this uncertain environment. The use of probabilistic predictions and game theory is an important element of many decision-making applications, given the need to compute expected utilities for mutually exclusive objectives to optimize performance. The Nash Equilibrium is synonymous with objective function, or value, of the game in an integer linear program.

As noted above, the illustrated example implements a game theoretic solution using linear programming optimization. The implementation handles non-linear problems via the use of subset summing of all feasible solutions during the decision-making portion of the algorithm. Other possible approaches include deep learning or neural networks, although these may require a large amount of training data. Furthermore, an interior-point algorithm is also used, i.e., the primal-dual method, which requires feasibility for convergence. The primal standard form, which is used to calculate optimal tasks and characteristics, is:

$$\text{minimize}(f * x) \text{ s.t.} \quad (1)$$
$$A * x = b$$
$$x \geq 0$$

The dual problem, which is used to calculate optimal parameters, is:

$$\text{maximize}(b' * y) \text{ s.t.} \quad (2)$$
$$A' * y + s = f$$
$$s \geq 0$$

Knowing the optimal direction decision based on detected UAV health, the associated parameter (column) may be found given the decision (row). An error function is then used to determine the optimal weights and the importance of each parameter for Q-Learning.

In the present example, the optimal weights for each input parameter is determined using a Q-Learning mathematical method, which typically requires only a relatively small amount of training data to be successful. An additional benefit of Q-Learning is that it may also be used to model the response time in the dynamic system when the system oversight portion is used to direct individual UAVs 31 to a new desired optimal position due to changing environmental system parameters.

Free-space path loss (FSPL) is the loss in signal strength of an electromagnetic wave with an unobstructed line-of-sight path through free space (usually air). We model signal attenuation using the inverse square law:

$$S = P/(4\pi d^2) \quad (3)$$

where S is the power spatial density in watts per square meter; and P is the equivalent isotropically radiated power in watts referenced to 1 meter.

The object of the game is to minimize the path loss for each link in the communication relay chain such that an overall higher quality of communication is achieved, and more particularly a level of quality that helps ensure that all operational requirements will be met. The dynamics of two scenarios are discussed further below, but the first scenario (FIG. 5) involves a degradation of UAV 3. The second scenario (FIG. 6) involves a degradation of UAVs 1 and 5. Note that degradation in this context is understood to mean reduced throughput as a function of propagation distance and not a full node failure. The simulations demonstrate that other UAVs may reposition themselves closer to degraded UAV(s) to regain the minimum required network throughput.

The oversight controller 34 modifies the parameter weights to optimize UAV 31 positioning. It should be noted that there may be multiple levels of hierarchy for system oversight or harmonization. Also, training of the oversight block with regard to parameter weights may need to be application-specific if the concept of operations (CONOPS) changes significantly.

For the purposes of these two examples, the specific application for the system 30 is data exfiltration. The use of game theory as a computation engine scales well with multiple UAVs 31. The number of parameters per UAV 31 remains constant since only the closest neighbors are considered. A simulation tool allows the user to visualize and record the time for each UAV 31 to arrive at its optimal station, which increases when more UAVs are added to the chain. Sensor data may be exfiltrated by one or more UAVs that act as "data mules" by visiting each sensor in order to establish a communication link.

Q-Learning attempts to learn the relevance of each parameter, previously discussed, such that the best decision is chosen. This approach requires sufficient training data for the system 30 to learn under various conditions. Once the parameter weights are learned, the system 30 will then perform best. The oversite controller 34 adjusts parameter weights for individual UAVs 31 to enhance end-to-end system performance. The learning rate may be further adjusted by the user to understand functional time lines in the system.

Q-Learning may be used for function approximation, which enables the application of the algorithm to large problems, even when state space is continuous and, therefore, infinitely large. The approach used herein is characterized by the system 30 learning what the weights should be for each parameter to achieve optimal system performance. The system 30 uses Q-Learning to assign optimal weights as a Markov decision process (MDP). Q-Learning is useful in determining weights for each dimension in the system and may provide insight into relationships among objectives, which improves the understanding of the problem. Although each period is modeled as independent, four dimensions within a period are considered dependent, sequential Markov functions.

In the present example, an optimal, multi-objective Markov action-selection decision-making function is used with Q-Learning. The system 30 is flexible and may handle any number of inputs. By optimizing weights from these inputs, multiplied by the Nash Equilibrium (NE) values for each of the dimension possibilities per period, optimization of UAV positioning is achieved, which results in significant improvements in overall system performance. The simulations feature six dimensions with conflicting objectives that depend on each UAV to achieve an optimal positioning solution, although other numbers of dimensions may also be used in different implementations.

Because the simulations utilized a mathematical model to characterize dynamic real-world processes, approximations were used to reduce the otherwise intractable complexities. Linearity assumptions are usually sufficient approximations. Other approximations may also be used to account for uncertainties associated with the accuracy and/or completeness of the data input to the model. Without sufficient insight into the relevant information, it is appropriate to assign approximate values to variables in a linear equation. Moreover, that information may change. Sensitivity analysis, i.e., a systematic assessment of the extent to which solutions are sensitive to changes in data is important in quantifying the validity of the results. In the present examples, we define the Q-Learning equation as:

$$\text{newWeight}=(1-\text{error}A,B,C,D,E\_\text{norm})*(\text{NashEquilibriumValue})/(\Sigma\_\text{vparams }[(1-\text{error}A,B,C,D,E\_\text{norm})*(\text{NashEquilibriumValue})]) \quad (4)$$

Where A, B, C, D, and E are parameters.

$$\text{QLearnedWeight}=\text{oldWeight}+\text{learningRate}*(\text{newWeight}-\text{oldWeight}) \quad (5)$$

Figure 7:
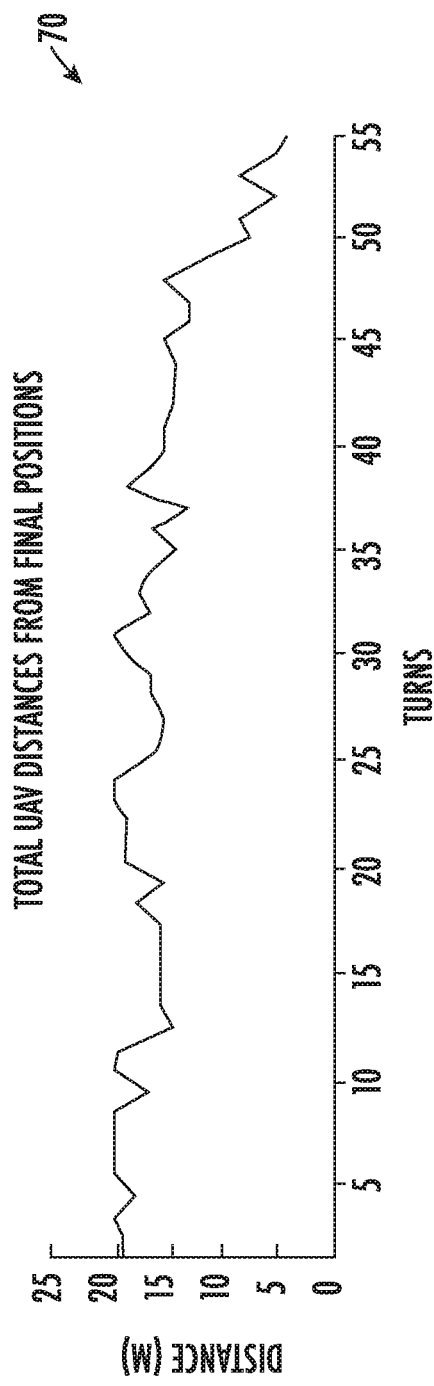
FIGS. 7 and 8 are graphs of iterations vs. time required for mobile vehicle repositioning in the example of FIG. 5.
Figure 8:
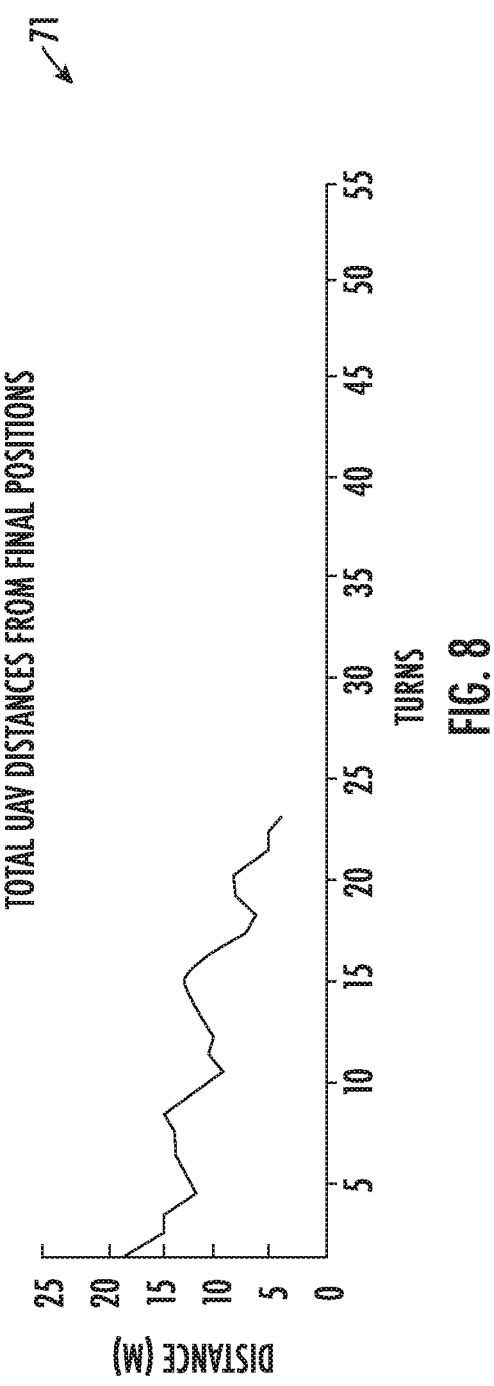
Figure 9:
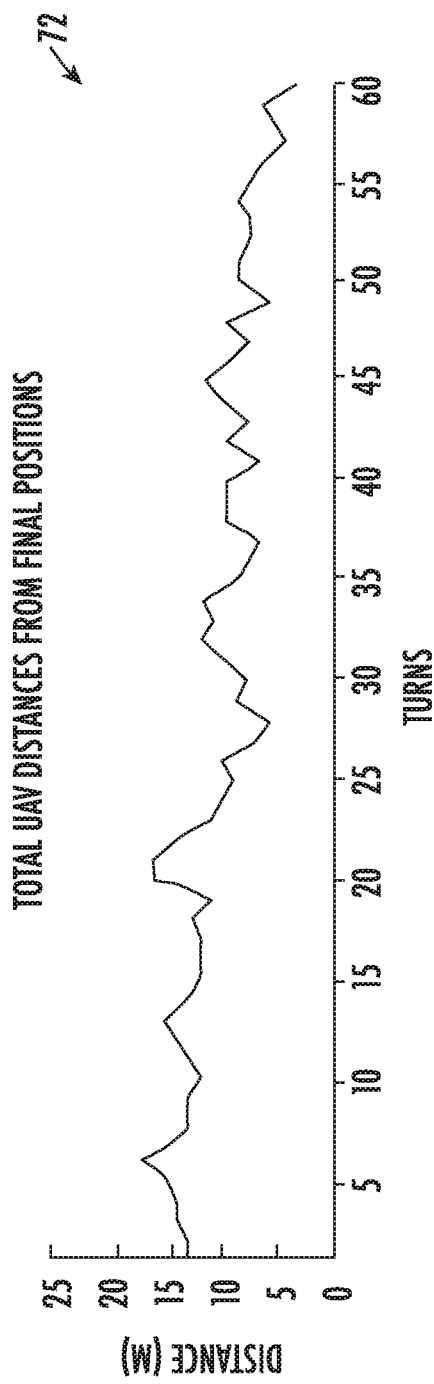
FIGS. 9 and 10 are graphs of iterations vs. time required for mobile vehicle repositioning in the example of FIG. 6.
Figure 10:
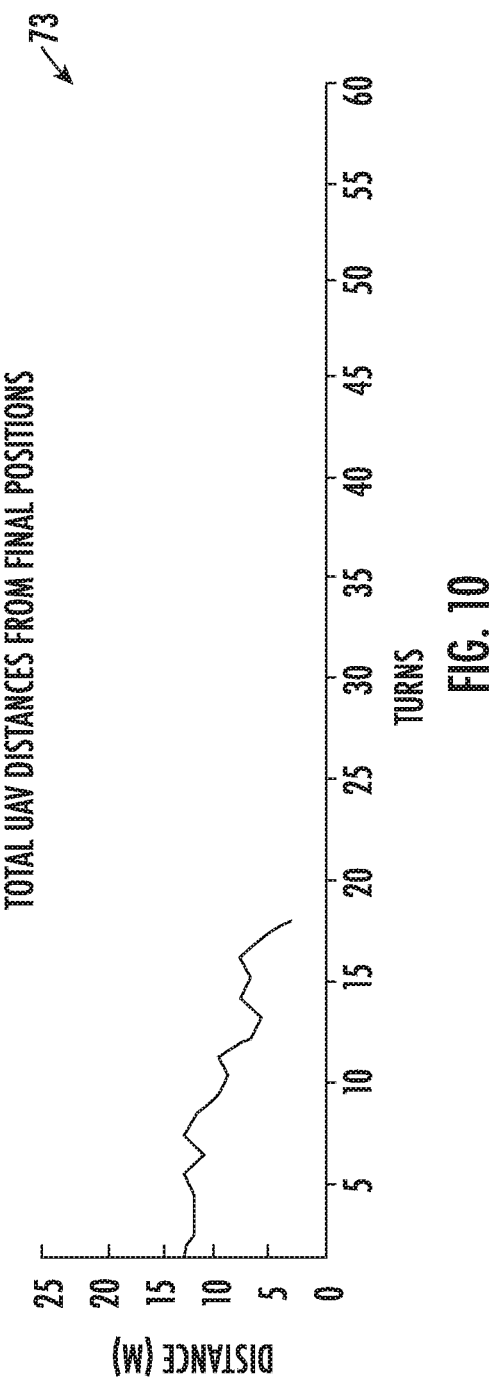

The results of the simulations for the two scenarios described above are shown in the graphs 70, 71 of FIGS. 7-8 for the first scenario (shown in FIG. 5), and in graphs 72, 73 of FIGS. 9-10 for the second scenario (shown in FIG. 6), for two different learning rates for each scenario. More particularly, the learning rates are 0.1 for the results shown in FIGS. 7 and 9, and 0.5 for the results shown in FIGS. 8 and 10. The parameter weights are normalized such that they add up to one. From this it may be determined which parameters are most important for optimal settings. Tuning the parameter weights is also useful in providing valuable insight into the system 30. The learning rate determines to what extent newly acquired information will override old information. A factor of 0 will disable learning by an agent, while a factor of 1 will force the agent to consider only the most recent information. The discount factor determines the importance of future rewards. A factor of 0 will make an agent shortsighted by only considering current rewards, while a factor approaching 1 will make an agent strive for a long-term higher reward.

It should be noted that in Scenario 1, UAVs 2 and 4 move closer to UAV 3 to provide assistance. In Scenario 2, UAVs 2 and 4 move closer to 1 and 5, respectively, to provide a higher throughput relay link, which is the goal. For each UAV, the six weights are optimally determined using Q-Learning. The dynamic maneuver is completed in 55 turns when the learning rate is 0.1 (FIG. 7) and in 23 turns when the learning rate is 0.5 (FIG. 8) for Scenario 1. GLO oversight causes Rcv Left and Dist Left parameters to receive lower weighting for UAV 2, while Rcv Right and Dist Right receive lower weighting for UAV 4. The dynamic maneuver is completed in 60 turns when the learning rate is 0.1 (FIG. 9), and in 18 turns when the learning rate is 0.5 (FIG. 10) for Scenario 2. GLO oversight causes Rcv Right and Dist Right parameters to receive lower weighting for UAV 2, while Rcv Left and Dist Left receive lower weighting for UAV 4.

In the simulated results, an Additive White Gaussian Noise (AWGN) channel is assumed. Moreover, Quadrature Phase Shift Keying (QPSK) is also used, and a necessary raw (before code correction) bit error rate (BER) of at least $10^{-4}$ is also assumed. Furthermore, an operational throughput of 0.5 dB was used. A P of 20 watts was used for equation (3), with an in-band noise floor of 2 watts at each UAV. This yielded a signal-to-noise ratio (SNR) as a function of distance. Degradation may be due to a local increase in the noise floor.

The UAV swarm needs to arrange itself such that the SNR is maintained at or above the level where the Eb/NO yields the required BER on each link. Once the required throughput is met, the minimum transmit power may be optimized. The table 110 in FIG. 11 shows that both scenarios 1 and 2 may handle the degradation of one or two UAVs when using cooperation. However, the experiments also indicate that it is unlikely that the system 30 could handle additional UAV degradation(s). Without cooperation, neither scenario will achieve the required signal integrity for all communication links. The parameters and equations used in the simulations are as follows:

$S=Pt/(4\pi d2)$, d is in meters;
$Pt=20W$ (13 dBW);
$NO=2W$ (3 dBW);
BER requirement=$10^{-4}$;
Bit Rate, Rb=100,000 bits/sec, throughput=0.5;
$SNR=S/NO=20W/2W=10$;
$SNR=S/NO=13$ dBW/3 dBW=10;
$SNR=(Rb*Eb)/NO$;
$Eb=SNR*NO/Rb=10*2/100,000=0.0002=2*10^{-4}$;
$f=1$ MHz;
RCV Gain, Gr=15 dBW;
XMT Gain, Gt=3 dBW;
Power in dBW=$10*\log 10(\text{Power}/1W)$;

Power in W=10(Power in dBW/10); and

FSPL=20*log10(d)+20*log10(f)+20*log10(4n/c)-Gt-Gr.

Figure 12:
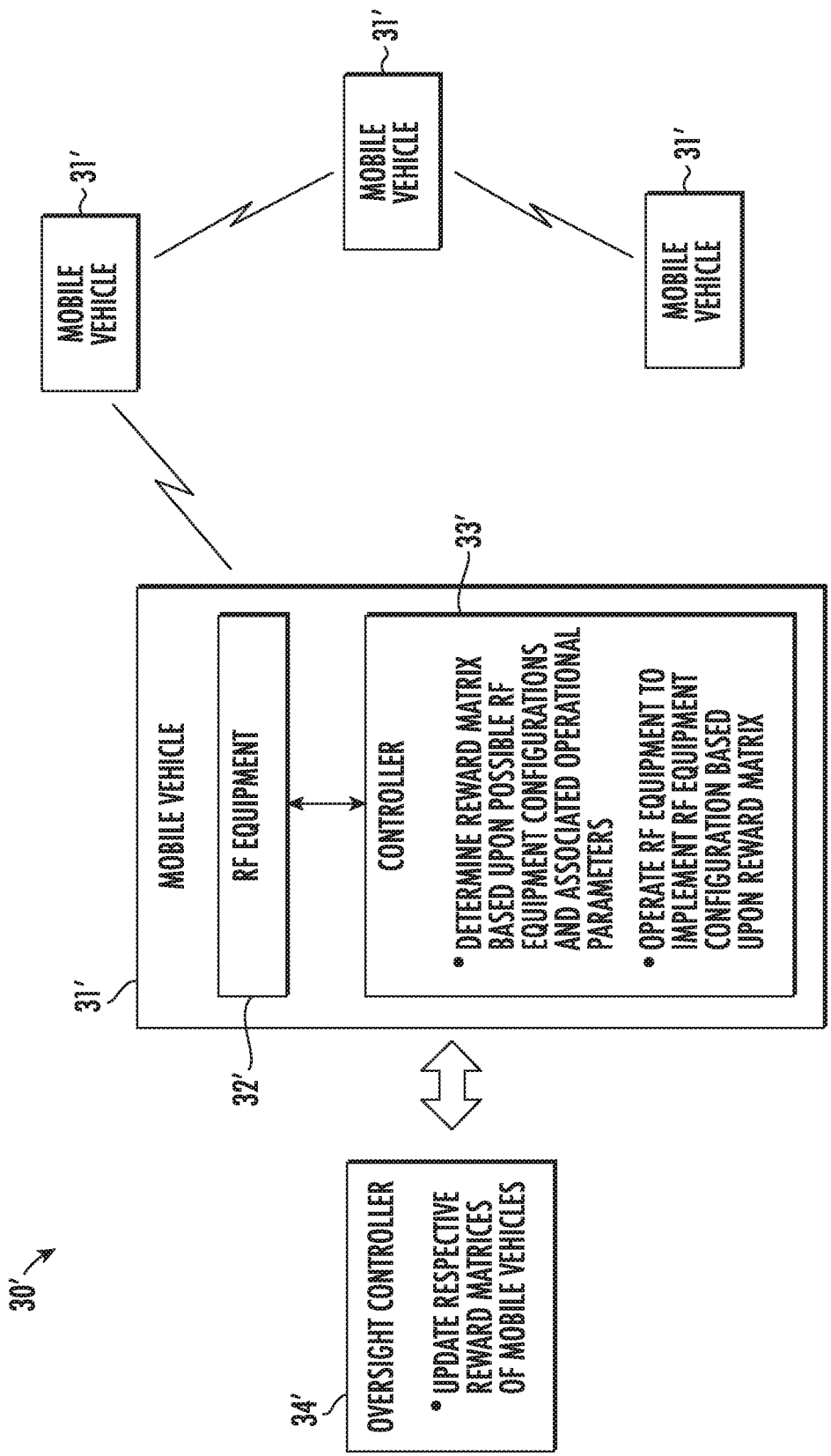
FIG. 12 is a schematic block diagram of an RF communication system in accordance with another example embodiment.
Figure 13:
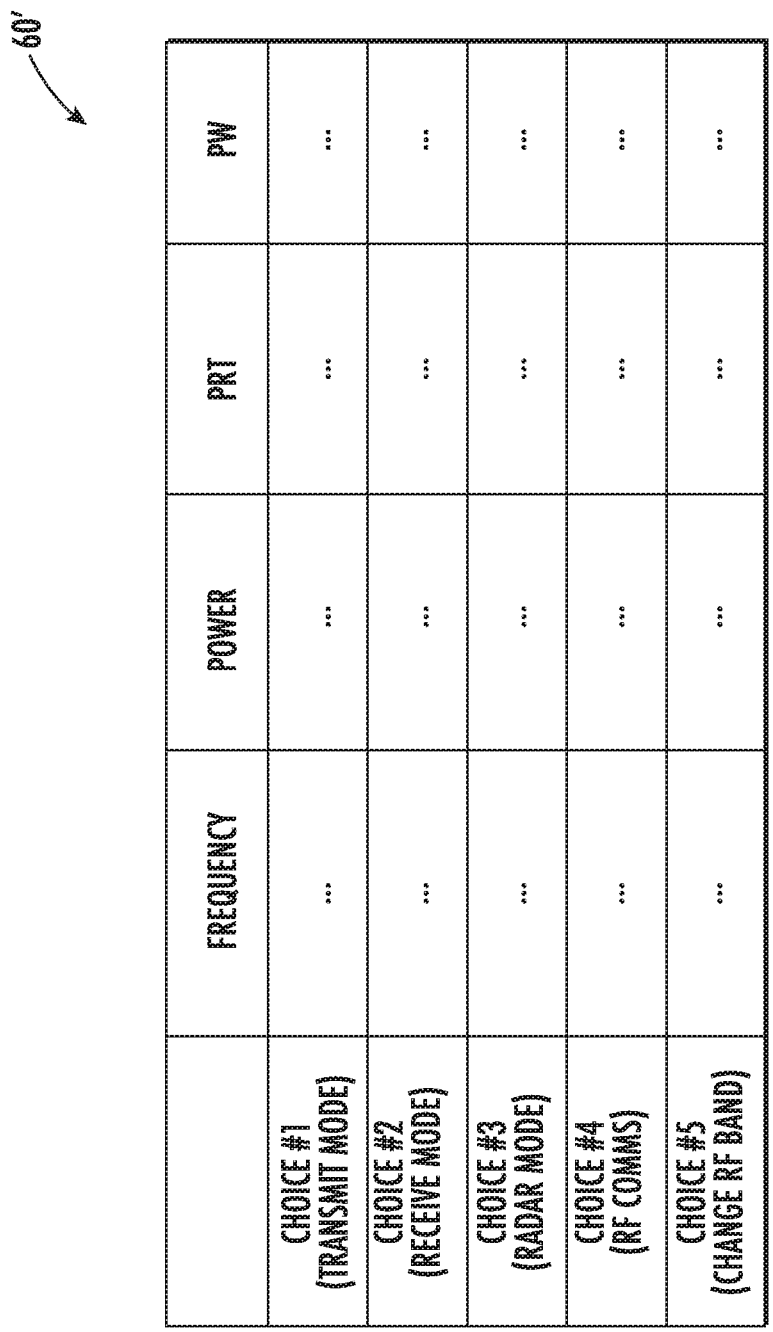
FIG. 13 is a table illustrating an example reward matrix which may be used by the mobile vehicles of the system of FIG. 12.
Figure 14:
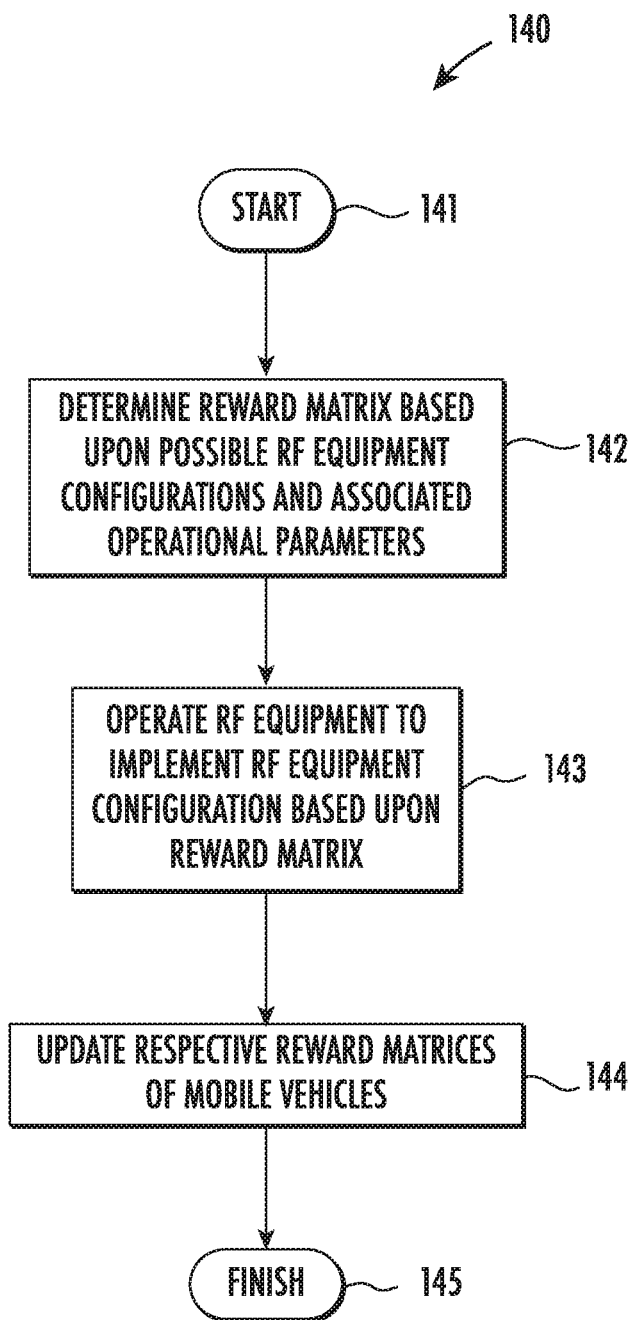
FIG. 14 is a flow diagram illustrating method aspects associated with the system of FIG. 12.

Turning now to FIGS. 12-13 and the flow diagram 140 of FIG. 14, another example RF communication system 30' is now described which utilizes a similar approach to advantageously help optimize RF equipment configurations for network nodes. More particularly, the system 30' illustratively includes a plurality of mobile vehicles 31' (e.g., UAVs, etc.), each of which illustratively includes RF equipment 32' and a controller 33' similar to those discussed above. Beginning at Block 141, each controller 33' in the present example is configured to determine a reward matrix 60' based upon possible RF equipment 32' configurations and associated operational parameters, at Block 142, and operate the respective RF equipment to implement an RF equipment configuration based upon the reward matrix (Block 143). The system 30' further illustratively includes an oversight controller 34' which is similarly configured to update respective reward matrices of the plurality of mobile vehicles 31' as described above, at Block 144. The method of FIG. 14 illustratively concludes at Block 145.

In the example reward matrix 60', five example operational choices are available (column 1), namely a transmit mode, a receive mode, a radar mode, an RF communications mode, and a change in the operating RF frequency band, although other operational choices may be used in different embodiments.

Furthermore, the associated parameters used for deciding which operational mode is appropriate for a given mobile vehicle 31' are frequency (col. 2), power (col. 3), pulse repetition time (PRT) (col. 4), and pulse width (PW). Here again, other parameters may be appropriate for reward matrix decision making in different embodiments. The reward matrix 60' may advantageously be utilized in a similar manner as described above with reference to FIGS. 4-11 for weighting and selecting appropriate RF operational choices based upon linear optimization (or other suitable approach) to provide a self-forming, self-organizing, cooperative, and autonomous RF communication system.

In the case of UAVs, the use of wireless communications and network-centric topologies with unmanned UAVs creates an opportunity to combine concepts of wireless beamforming in opportunistic random arrays and swarm UAVs. Similar in concept to collaborative beamforming techniques used in ground-based randomly distributed array systems, the present approach may advantageously improve wireless beamforming performance by leveraging cooperative location and function knowledge. This helps to enable the capabilities of individual UAVs to be enhanced, using swarming and cooperative beamforming techniques, for more-effective support of complex RF functionality. In addition, the dedicated oversight controller 34' is used to advantageously help optimize the number of beamforming UAVs 31' required to perform the desired RF operations. The use of UAV swarm concepts for a widely dispersed, wirelessly networked opportunistic array may advantageously help realize significant performance gains over single platform-based opportunistic arrays.

An enhanced multi-UAV, intelligent swarm system is dynamic and flexible, enabling it to respond to emerging conditions that could impact network performance. Its ability to dynamically adjust individual parameter weightings to account for changing conditions help ensure that UAV positioning decisions account for both the immediate needs of a given network node and the overall needs of the network. These conflicting needs form the basis for applying a game-theory-based scenario in which each UAV 31' is alternately pushed or pulled over time to new positions until reaching a steady state or Nash Equilibrium, as described further above.

Further details regarding cooperative and autonomous RF communication systems may be found in the following: co-pending application entitled "RADIO FREQUENCY (RF) COMMUNICATION SYSTEM PROVIDING ENHANCED MOBILE VEHICLE POSITIONING BASED UPON REWARD MATRICES AND RELATED METHODS", which is assigned to the Assignee of the present application; Rahmes et al., "Cooperative Cognitive Electronic Warfare UAV Game Modeling for Frequency Hopping Radar", Mark Rahmes, Dave Chester, Rich Clouse, Jodie Hunt, Tom Ottoson, "Cooperative Cognitive Electronic Warfare UAV Game Modeling for Frequency Hopping Radar", SPIE April 2018; and Rahmes et al., "Optimizing Cooperative Games for Cognitive Communication UAVs with Q-Learning", Rahmes, M., Chester, D., Clouse, R., Hunt, J., "Optimizing Cooperative Games for Cognitive Communication UAVs with Q-Learning", IITSEC December 2017, all of which are hereby incorporated herein in their entireties by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) communication system comprising:
    an oversight controller configured to generate a plurality of operational RF parameter weights corresponding to a steady RF operating state corresponding to a Nash Equilibrium; and
    a plurality of mobile vehicles, each mobile vehicle comprising
    RF equipment, and
    a controller configured to
        determine a reward matrix including a plurality of different RF equipment configurations and associated RF operational parameters, and
        operate the RF equipment to implement an RF equipment configuration based upon the reward matrix and the operational RF parameter weights from the oversight controller to achieve the steady RF operating state.

2. The RF communication system of claim 1 wherein the possible RF equipment configurations comprise transmit and receive operating configurations.

3. The RF communication system of claim 1 wherein the possible RF equipment configurations comprise radar operating configurations.

4. The RF communication system of claim 1 wherein the possible RF equipment configurations comprise operating frequency band configurations.

5. The RF communication system of claim 1 wherein the oversight controller is configured to update the reward matrices by changing the operational RF parameter weights associated with at least some of the operational parameters.

6. The RF communication system of claim 5 wherein the oversight controller is configured to change the operational RF parameter weights based upon Q-learning.

7. The RF communication system of claim 1 wherein each controller is configured to implement an RF equipment configuration based upon the reward matrix and a linear optimization.

8. The RF communication system of claim 1 wherein each mobile vehicle comprises an unmanned aerial vehicle (UAV).

9. A radio frequency (RF) communication system comprising:
   an oversight controller configured to generate a plurality of operational RF parameter weights corresponding to a steady RF operating state corresponding to a Nash Equilibrium; and
   a plurality of mobile vehicles, each mobile vehicle comprising
   RF equipment, and
   a controller configured to
      determine a reward matrix including a plurality of different RF equipment configurations and associated operational parameters, and
      operate the RF equipment to implement an RF equipment configuration based upon the reward matrix and the operational RF parameter weights from the oversight controller using a linear optimization to achieve the steady RF operating state; and
   wherein the oversight controller is configured to update the operational RF parameter weights associated with at least some of the operational parameters.

10. The RF communication system of claim 9 wherein the possible RF equipment configurations comprise transmit and receive operating configurations.

11. The RF communication system of claim 9 wherein the possible RF equipment configurations comprise radar operating configurations.

12. The RF communication system of claim 9 wherein the possible RF equipment configurations comprise operating frequency band configurations.

13. The RF communication system of claim 9 wherein the oversight controller is configured to change the operational RF parameter weights based upon Q-learning.

14. The RF communication system of claim 9 wherein each mobile vehicle comprises an unmanned aerial vehicle (UAV).

15. A radio frequency (RF) communications method for a plurality of mobile vehicles, each mobile vehicle comprising RF equipment, and the method comprising:
   an oversight controller configured to generate a plurality of operational RF parameter weights corresponding to a steady RF operating state corresponding to a Nash Equilibrium; and
   at each mobile vehicle,
      determining a reward matrix including a plurality of different RF equipment configurations and associated RF operational parameters, and
      operating the RF equipment to implement an RF equipment configuration based upon the reward matrix and the operational RF parameter weights from the oversight controller to achieve the steady RF operating state.

16. The method of claim 15 wherein the possible RF equipment configurations comprise transmit and receive operating configurations.

17. The method of claim 15 wherein the possible RF equipment configurations comprise radar operating configurations.

18. The method of claim 15 wherein the possible RF equipment configurations comprise operating frequency band configurations.

19. The method of claim 15 further comprising updating the reward matrices comprises updating the reward matrices by changing the operational RF parameter weights associated with at least some of the operational parameters.

20. The method of claim 19 wherein changing the weights comprises changing the weights based upon Q-learning.

21. The method of claim 15 wherein implementing the RF equipment configuration comprises implementing the RF equipment configuration based upon the reward matrix and a linear optimization.

22. The method of claim 15 wherein each mobile vehicle comprises an unmanned aerial vehicle (UAV).

* * * * *